United States Patent
Chamarti et al.

(10) Patent No.: US 8,799,481 B2
(45) Date of Patent: *Aug. 5, 2014

(54) METHOD AND SYSTEM FOR DETECTION OF COMMUNICATION ACTIVITIES OF A METER BOARD

(75) Inventors: Subramanyam Satyasurya Chamarti, Johns Creek, GA (US); Lane Leslie Manoosingh, Marietta, GA (US); Michael George Glazebrook, Marietta, GA (US); Vikas Mohan Sharma, Suwanee, GA (US)

(73) Assignee: General Electric Company, Schenectady, NY (US)

( * ) Notice: Subject to any disclaimer, the term of this patent is extended or adjusted under 35 U.S.C. 154(b) by 217 days.

This patent is subject to a terminal disclaimer.

(21) Appl. No.: 13/232,196

(22) Filed: Sep. 14, 2011

(65) Prior Publication Data

US 2013/0067096 A1     Mar. 14, 2013

(51) Int. Cl.
*G06F 15/16* (2006.01)

(52) U.S. Cl.
USPC ........................................... 709/227

(58) Field of Classification Search
None
See application file for complete search history.

(56) References Cited

U.S. PATENT DOCUMENTS

| | | |
|---|---|---|
| 6,184,672 B1 | 2/2001 | Berkcan |
| 6,963,195 B1 | 11/2005 | Berkcan |
| 7,010,439 B2 | 3/2006 | Martin Neira et al. |
| 7,572,623 B2 | 8/2009 | Mangano et al. |
| 7,714,735 B2 | 5/2010 | Rockwell |
| 7,847,543 B2 | 12/2010 | Grno |
| 7,925,388 B2 | 4/2011 | Ying |
| 7,937,247 B2 | 5/2011 | Carter et al. |
| 7,940,679 B2 | 5/2011 | Kelley et al. |
| 7,966,640 B1 | 6/2011 | Harvey et al. |
| 2007/0264939 A1* | 11/2007 | Sugar ................. 455/67.11 |
| 2009/0206059 A1 | 8/2009 | Kiko |
| 2009/0265042 A1 | 10/2009 | Mollenkopf et al. |
| 2010/0023283 A1 | 1/2010 | Boutorabi et al. |
| 2010/0070217 A1 | 3/2010 | Shimada et al. |
| 2010/0191389 A1 | 7/2010 | Deaver, Sr. et al. |
| 2011/0046799 A1* | 2/2011 | Imes et al. ................ 700/286 |
| 2011/0115642 A1 | 5/2011 | Gilbert et al. |
| 2011/0264291 A1* | 10/2011 | Le Roux et al. .......... 700/291 |
| 2012/0290142 A1* | 11/2012 | Lee et al. ................. 700/291 |
| 2013/0204448 A1* | 8/2013 | Lee et al. ................. 700/291 |

FOREIGN PATENT DOCUMENTS

WO     2010103332 A1     9/2010

* cited by examiner

*Primary Examiner* — Ario Etienne
*Assistant Examiner* — Clayton R Williams
(74) *Attorney, Agent, or Firm* — Fletcher Yoder, P.C.

(57) ABSTRACT

Described herein are embodiments of methods and systems for detecting communications of a first meter board by a second meter board. In accordance with one aspect, a method is provided for detecting communications of a first meter board by a second meter board. In one embodiment, the method includes: receiving a signal, wherein the signal indicates a presence of communication activities between a first processor and another device over a network.

39 Claims, 7 Drawing Sheets

Receive A Signal, Wherein The Signal Indicates The Presence Of Communication Activities Between A First Process And Another Device Over A Network
602

FIG. 6

Communication Activities Are Initiated With A Device Over A Network
702

Provide A Separate Signal, Wherein The Separate Signal Indicates A Presence Of The Communication Activities With The Device Over The Network
704

FIG. 7

METHOD AND SYSTEM FOR DETECTION OF COMMUNICATION ACTIVITIES OF A METER BOARD

CROSS REFERENCE TO RELATED APPLICATION

This application is related to and claims benefit of co-pending application Ser. No. 13/232,224, filed on Sep. 14, 2011, and co-pending application Ser. No. 13/232,235, filed on Sep. 14, 2011, both of which are fully incorporated herein by reference and made a part hereof.

FIELD OF THE INVENTION

This invention generally relates to utility communications, and in particular, to systems and methods for detecting communications between a first meter board and a device.

BACKGROUND OF THE INVENTION

The increasing demand for energy and the use of finite resources for energy production have led to the use of increased technology for the production, transmission, distribution and consumption of energy in order to make, distribute and use energy more efficiently and wisely. To that end, utility service providers have begun employing information technology systems integrated with their energy production, transmission, distribution and metering systems to enable more efficient monitoring and operation of such systems. Concurrently, vendors and manufacturers have also begun employing similar technology in products and devices that consume electricity, such as appliances (e.g., refrigerators, washing machines and dryers, dishwashers, HVAC systems, lighting systems, stoves, water heaters, etc.) and electronics (e.g., televisions, stereos, computers, etc.). These efforts are often broadly categorized as smart grid, smart meter and smart appliance or smart device technologies.

The smart grid marries information technology with the current electrical infrastructure. The smart grid is, in essence, an "energy Internet," delivering real-time energy information and knowledge—empowering smarter energy choices. Roles for the smart grid include enabling the integration and optimization of more renewable energy (such as wind and solar); driving significant increases in the efficiency of the electrical network; and, empowering consumers to manage their energy usage and save money without compromising their lifestyle.

Smart grid technologies provide utilities and consumers with real-time knowledge and decision-making tools that empowers them to save energy, resources, money, and the environment. The smart grid is not a singular product, but rather a collection of hardware and software that works together to make today's electrical grid more intelligent. Similar to how the Internet turned a disaggregated collection of computers into a more powerful tool, overlaying the current power infrastructure with smart grid technology is like connecting the Internet to the computer, making an already useful machine much better and providing people with information to make intelligent decisions. Similarly, the smart grid, or the "energy Internet," empowers consumers, businesses and utilities to make smarter energy choices.

Smart grid components include automation software and intelligent electronic hardware systems that control the transmission and distribution grids. Smart grid automation technologies—such as energy management systems and distribution management systems—help provide real-time knowledge and control over the distribution and transmission grids. On the transmission side, Energy Management Systems (EMS) provide real-time information on the grid's status, helping utilities automate various grid functionalities remotely. This automation technology helps utilities choose the best, most affordable generation mix (known as economic dispatch), keeping costs lower for consumers and businesses; reduce losses and waste in the delivery of power to drive a more efficient system; and maintain system reliability to help ensure a steady supply of power to customers. Distribution Management System (DMS) comprises the smart grid automation technology that provides utilities with real-time information about the distribution network and allows utilities to remotely control switches in the grid. The DMS is the heart of a smarter distribution grid; enabling utilities to manage distributed renewable generation, support grid efficiency technologies, and control the isolation and restoration of outages. Without DMS, the utility gets very little real-time information about the distribution grid and can't realize many of the benefits of a smarter grid.

Furthermore, smart grid technologies can extend beyond the electrical grid. With smart grid technologies in the home—like smart meters, smart energy panels, and smart appliances—consumers can have access to more accurate data and knowledge about electricity pricing, helping them save money and lower their environmental footprint.

Currently, most power companies offer one set price for electricity throughout the day, regardless of how expensive it is to produce. Most consumers don't know that it costs much more to produce energy during the peak hours of the day—typically between 2 p.m. and 7 p.m.—than it does at any other time. A smart meter can communicate time of use pricing via smart home energy panels or other display devices to help consumers make smarter energy choices throughout the day. Consumers will be more likely to use high-consuming devices during off-peak pricing periods, when electricity prices are cheaper. With smart meters, buying electricity is like buying other consumer goods—with price impacting purchase decision. For example, a consumer can choose to have their house pre-cooled before arriving home to ensure the air conditioning system can remain off during expensive peak pricing hours, without impacting the consumer's comfort level. A consumer can also have their water pre-heated to avoid peak prices and lower their energy bill. A year-long study by the U.S. Department of Energy showed that real-time pricing information provided by the smart meter helped consumers reduce their electricity costs 10% on average and their peak consumption by 15%.

Smart meters can also enable consumers to pre-pay their electricity bill and help utilities better detect and manage outages. Smart meters coupled with advanced metering infrastructure (AMI) helps pinpoint problems on the grid, allowing utilities to determine exactly which customers are without power. Compare this to today, when many utilities still wait for customer calls to notify them of outages.

Smart appliances can work in concert with smart meters and the smart grid to avoid peak-hour energy use and top-tier pricing-without any negative impact on the consumer-by adapting to price signals from the utility. For example, a dryer may automatically switch from high heat to "fluff" if electricity hits a certain per-kilowatt-hour rate—even if the homeowner is at work. Or, the automatic defrost on a refrigerator can delay itself until a time of reduced electricity rates. If the freezer delays the defrost cycle until after peak energy hours, consumers pay less for the same amount of energy. There are countless ways to conserve energy and save money when smart appliances are coupled with smart meters and time-of-use pricing information including, for example, updating software or firmware of a smart appliances using the smart grid and smart meter infrastructure. The smart grid, smart meter and smart appliance technologies enable utilities to communicate (duplex) with smart appliances in the home. This ability creates opportunities beyond that of energy management. For example, in some instances a meter (e.g., a "smart meter") can acts as an energy service portal (ESP), which provides a connection between a first network (e.g., the network between the head end server and the meter), and a second network (e.g., the network between the devices within the home and the meter).

The second network receives its messages from the head end server of the first network, or a demand response management system (DRMS). DRMS are mechanisms to manage customer consumption of electricity in response to supply conditions, for example, having electricity customers reduce their consumption at critical times or in response to market prices. DRMS involves messages sent to demand response mechanisms that respond to these explicit requests to shut off Demand response can involve actually curtailing power used or by starting on site generation which may or may not be connected in parallel with the grid. Demand response is a component of smart energy demand, which also includes energy efficiency, home and building energy management, distributed renewable resources, and electric vehicle charging. Current demand response schemes are implemented with large and small commercial as well as residential customers, often through the use of dedicated control systems to shed loads in response to a request by a utility or market price conditions. Services (lights, machines, air conditioning) are reduced according to a preplanned load prioritization scheme during the critical time frames. An alternative to load shedding is on-site generation of electricity to supplement the power grid. Under conditions of tight electricity supply, demand response can significantly decrease the peak price and, in general, electricity price volatility.

Demand response is generally used to refer to mechanisms used to encourage consumers to reduce demand, thereby reducing the peak demand for electricity. Since electrical generation and transmission systems are generally sized to correspond to peak demand (plus margin for forecasting error and unforeseen events), lowering peak demand reduces overall plant and capital cost requirements. Depending on the configuration of generation capacity, however, demand response may also be used to increase demand (load) at times of high production and low demand. Some systems may thereby encourage energy storage to arbitrage between periods of low and high demand (or low and high prices).

Generally, a smart meter is comprised of at least two separate electronic boards—a first board that controls communication between the smart meter and the first and second networks, and a second board that controls metrology functions and data management. These two boards are connected through an interface port. Because of the nature of smart grid, smart meter, and smart appliance technologies, a smart meter is not in constant communication with any other device (i.e., such communication involving the communication board is intermittent). However, when communicating, the communications board is by far the largest consumer of energy within the meter.

Therefore, methods and systems are desired that overcome challenges in the art, some of which are described above, to detect when the communication board in a meter is communicating.

BRIEF DESCRIPTION OF THE INVENTION

Described herein are embodiments of methods, systems and devices for detecting communication activities of a first meter board by a second meter board. In one aspect, the type of communication activities can be determined.

In accordance with one aspect, a method is provided for detecting communications of a first meter board by a second meter board. In one embodiment, the method includes: receiving a signal, wherein the signal indicates a presence of communication activities between a first processor and another device over a network.

In accordance with another aspect, a method is provided for a first meter board providing a signal indicating it is communicating. In one embodiment, the method includes: initiating communication activities with a device over a network; and providing a separate a signal, wherein the separate signal indicates a presence of the communication activities with the device over the network.

In accordance with yet another aspect, a system is described for detecting communications of a first meter board by a second meter board. One embodiment of the system is comprised of: a first board, wherein the first board is comprised of a first processor and a communication interface operably connected with the first processor; a second board, wherein the second board is comprised of a second processor; and an interface port, wherein the interface port connects the first board and the second board, wherein the first processor configured to: initiate communication activities with a device over a network using the communication interface; and provide a separate a signal to the second board using the interface port, wherein the separate signal indicates a presence of communication activities between the first board and the device over the network, and wherein the second processor configured to: receive the signal from the first board using the interface port, wherein the signal indicates the presence of communication activities between the first board and the device over the network.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 6 is a flowchart illustrating the operations that operations are illustrated that may be taken by the second processor according to one embodiment of the present invention;

FIG. 7 is a flowchart illustrating operations that may be taken by the first processor according to one embodiment of the present invention.

DETAILED DESCRIPTION OF THE INVENTION

Figure 1:
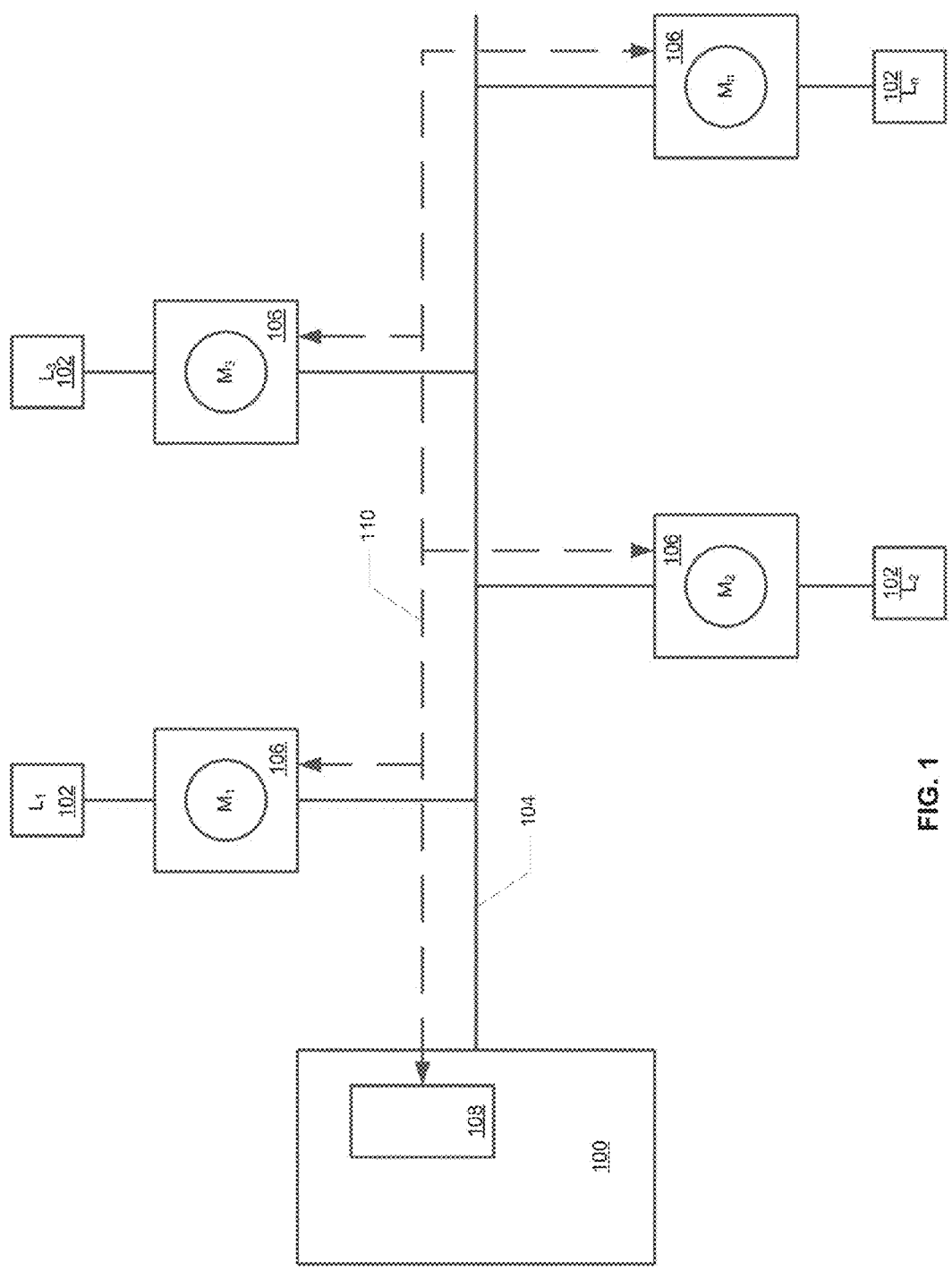
FIG. 1 is a block diagram of a section of an exemplary utility distribution system.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Smart appliances are appliances that can be programmed to operate when it is most cost effective to do so based on information such as time-of-use pricing signals from the utility. For example, a smart refrigerator would only enable the defrost cycle to occur when electricity prices are lowest, without compromising a consumer's lifestyle. In some instances, smart appliances are programmed or otherwise receive communications over networks, and can communicate with other computing devices and smart appliances over these networks. Smart devices such as programmable thermostats and water heater controls are configured to communicate with other computing devices, other smart devices, smart appliances and smart meters over one or more networks. Herein, smart appliances and smart devices will be referred to as "smart devices" or just "devices."

Smart meters are among the fundamental building blocks of smart grid deployments. They track and report energy usage by time of day, enabling utilities to charge less for electricity used during off-peak hours. As a result, consumers can choose to shift energy-intensive activities to times when rates are lower to save on energy costs. In general, smart devices can be configured to communicate with a smart meter and smart meters are configured to communicate with the smart grid. Generally, these communications are duplex. Furthermore, in some instances smart meters can be configured to communicate with devices within the home or location at which they are installed. For example, a smart meter may receive a signal from a utility server and then send a signal to a smart appliance within the home in accordance with the signal received from the utility server.

Smart appliances are appliances that can be programmed to operate when it is most cost effective to do so based on information such as time-of-use pricing signals from the utility. For example, a smart refrigerator would only enable the defrost cycle to occur when electricity prices are lowest, without compromising a consumer's lifestyle. In some instances, smart appliances are programmed or otherwise receive communications over networks, and can communicate with other computing devices and smart appliances over these networks. Smart devices such as programmable thermostats and water heater controls are configured to communicate with other computing devices, other smart devices, smart appliances and smart meters over one or more networks. Herein, smart appliances and smart devices will be referred to as "smart devices" or just "devices."

Referring to FIG. 1, an illustration of one type of system that would benefit from embodiments of the present invention is provided. FIG. 1 is a block diagram of a section of an exemplary utility distribution system such as, for example, an electric distribution system. As shown in FIG. 1, a utility service is delivered by a utility provider 100 to various loads $L_1$-$L_n$ 102 through a distribution system 104. In one aspect, the utility service provided is electric power. Consumption of the utility service by the loads 102 is measured at the load locations by meters $M_1$-$M_n$ 106. If an electric meter, the meter 106 can be single-phase or poly-phase electric meters, as known to one of ordinary skill in the art, depending upon the load 102. In one aspect, the electric meter 106 is a smart meter as described herein and as known to one of ordinary skill in the art. In one aspect, the meter 106 can act as an energy portal. An energy portal is a device or software that can be used to communicate with one or more devices within a home or at a location regarding energy consumption of the devices. For example, an energy portal can receive consumption information from a device and pass that information on to a utility 100. Similarly, an energy portal can receive communications from a utility 100 and cause on or more devices to shut down or to reduce their load. Hereinafter, the specification will refer to an "energy portal" as a "meter," "electric meter," and/or "smart meter," where the terms can be used interchangeably, though it is to be appreciated that an energy portal is not limited to a meter and that a meter is only one example of an energy portal. One non-limiting example of a smart meter is the GE I210+c meter as available from General Electric Company (Schenectady, N.Y.). In one aspect, the meter 106 can be configured to communicate via a second network (not shown in FIG. 1) with the loads 102. In one aspect, the meter 106 can be configured to communicate wirelessly with the loads 102 using, for example, a network such as a home area network (HAN). In one aspect, the loads 102 can be devices such as smart appliances, as described herein and as known to one of ordinary skill in the art. Smart appliances are available from vendors or manufacturers such as, for example, General Electric Company, Whirlpool Corporation (Benton Harbor, Mich.), LG Electronics USA (Englewood Cliffs, N.J.), among others.

While consumption information is used by the utility provider 100 primarily for billing the consumer, it also can be used for other purposes including planning and profiling the utility distribution system. In many instances, meters 106 are still read by hand, which can be costly, inefficient and error-prone. In some instances, utility providers 100 desire to electronically communicate with the meters 106 for numerous purposes including scheduling disconnection or connection of utility services to the loads 102, automatic meter reading (AMR), load shedding and load control, automatic distribution and smart-grid applications, outage reporting, providing additional services such as Internet, video, and audio, etc. In many of these instances, the meters 106 can be configured to communicate with one or more computing devices 108 through a communications network 110, which can be wired, wireless or a combination of wired and wireless, as known to one of ordinary skill in the art. In one aspect, the communications network can comprise at least part of a smart grid network. Therefore, it is desired that the meters 106 and system such as that shown in FIG. 1 are configured to have capabilities beyond that of mere delivery and measurement of utility services. In order to perform these capabilities, meters 106 have electronics that perform the desired functions. For example, a meter 106 can have a first board that can be configured to perform communications functions and a second board that can be configured to perform metrology and data management functions. These boards can be interconnected through an interface port. As the communication board is not in constant communication, in some instances, it is desired to be able to determine when the communication board is actively communicating through the network 110 or with other devices 102. In some instances, this information about the first (communication) board can be provided to the second (metrology and data management) board. Therefore, described herein are embodiments of methods and systems to detect communication of the first meter board. In general, the technical effects of embodiments of the present invention provide methods and systems of detecting when a first meter board is performing communication activities. Further, in some embodiments the type of communication activities can be discerned and displayed.

Figure 2:
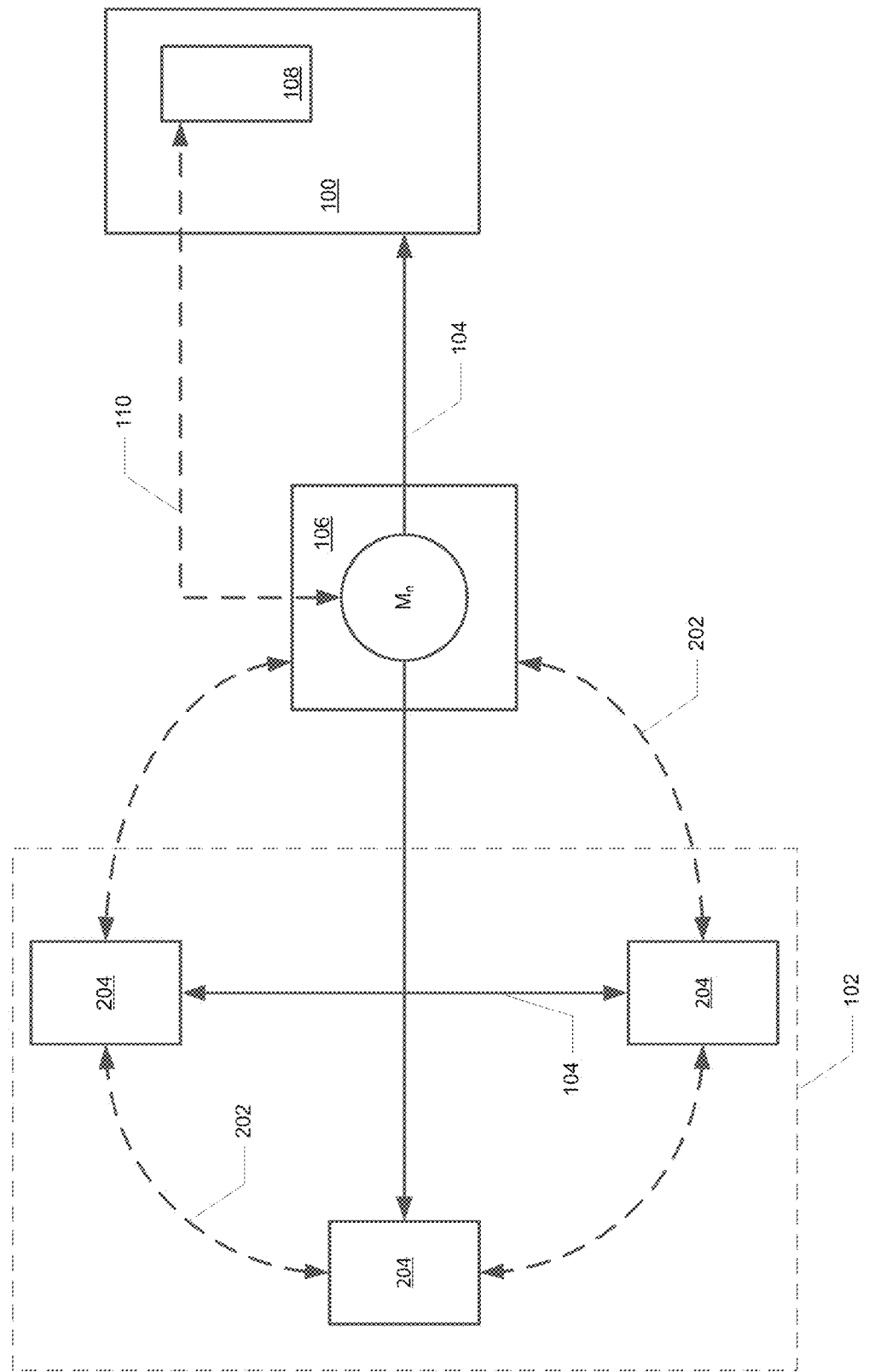
FIG. 2 is an exemplary illustration of an embodiment of a system comprised of a meter configured to communicate with a device such as computing device or a smart appliance over a first network or a second network.

FIG. 2 is an exemplary illustration of an embodiment of a system comprised of a meter 106 configured to communicate with a device such as computing device 108 over a first network 110. In one aspect, the meter 106 can also be configured to communicate with one or more appliances or devices 204 over a second network 202. In one aspect, the devices 204 are smart appliances and smart devices as described herein and as known to one of ordinary skill in the art. As used herein, the specification will refer to a device 204 as an "appliance," a "smart appliance," and/or a "smart device," where the terms can be used interchangeably. As shown in FIG. 2, a second network 202 can be used to communicate between one or more smart appliances or smart devices 204 and the meter 106. In one aspect, one or more smart devices 204 comprise at least a portion of the load 102, and can form a network 202 that communicates with the meter 106. The meter 106 also measures consumption of the utility service (e.g., electric power) as provided by the distribution system 104. Furthermore, the meter 106 is configured to communicate over a first network 110. In one aspect, the meter 106 can communicate with at least a computing device 108 via the first network 110. In one aspect, the meter 106 is operably connected to the second network 202. In one aspect, information can be transmitted to or from the meter 106 from the smart device 204 via the network 202 comprised of one or more of a WPAN (e.g., IEEE 802.15n (any version), Zig-Bee®, Bluetooth®), LAN/WLAN (e.g., 802.11n, microwave, laser, etc.), WMAN (e.g., WiMAX®, etc.), WAN/WWAN (e.g., UMTS, GPRS, EDGE, CDMA, GSM, CDPD, Mobitex®, HSDPA, HSUPA, 3G, etc.), RS232, USB, Firewire®, Ethernet®, wireless USB, cellular, HAN, OpenHAN®, power line carrier (PLC), broadband over power lines (BPL), TCP/IP, wireless TCP/IP, ModBus®, and the like. Furthermore, information can be transmitted to or from the computing device 108 and the meter 106 via the first network 110 that can be comprised of one or more of a WPAN (e.g., IEEE 802.15n (any version), ZigBee®, Bluetooth®), LAN/WLAN (e.g., 802.11n, microwave, laser, etc.), WMAN (e.g., WiMAX®, etc.), WAN/WWAN (e.g., UMTS, GPRS, EDGE, CDMA, GSM, CDPD, Mobitex®, HSDPA, HSUPA, 3G, etc.), RS232, USB, Firewire®, Ethernet®, wireless USB, cellular, HAN, OpenHAN®, power line carrier (PLC), broadband over power lines (BPL), TCP/IP, wireless TCP/IP, ModBus®, and the like. In one aspect, the first network 110 comprises at least a portion of a smart grid network. In one aspect, the first network 110 comprises an advanced metering infrastructure (AMI). AMI refers to systems that measure, collect and analyze energy usage, and interact with advanced devices such as electricity meters, gas meters, water meters, and the like through various communication media either on request (on-demand) or on pre-defined schedules. This infrastructure includes hardware, software, communications, consumer energy displays and controllers, customer associated systems, meter data management (MDM) software, supplier and network distribution business systems, and the like. The network 110 between the measurement devices (e.g., meters 106) and business systems allows collection and distribution of information to customers, suppliers, utility companies and service providers. This enables these businesses to either participate in, or provide, demand response solutions, products and services. By providing information to customers, the system assists a change in energy usage from their normal consumption patterns, either in response to changes in price or as incentives designed to encourage lower energy usage use at times of peak-demand periods or higher wholesale prices or during periods of low operational systems reliability.

Figure 3:
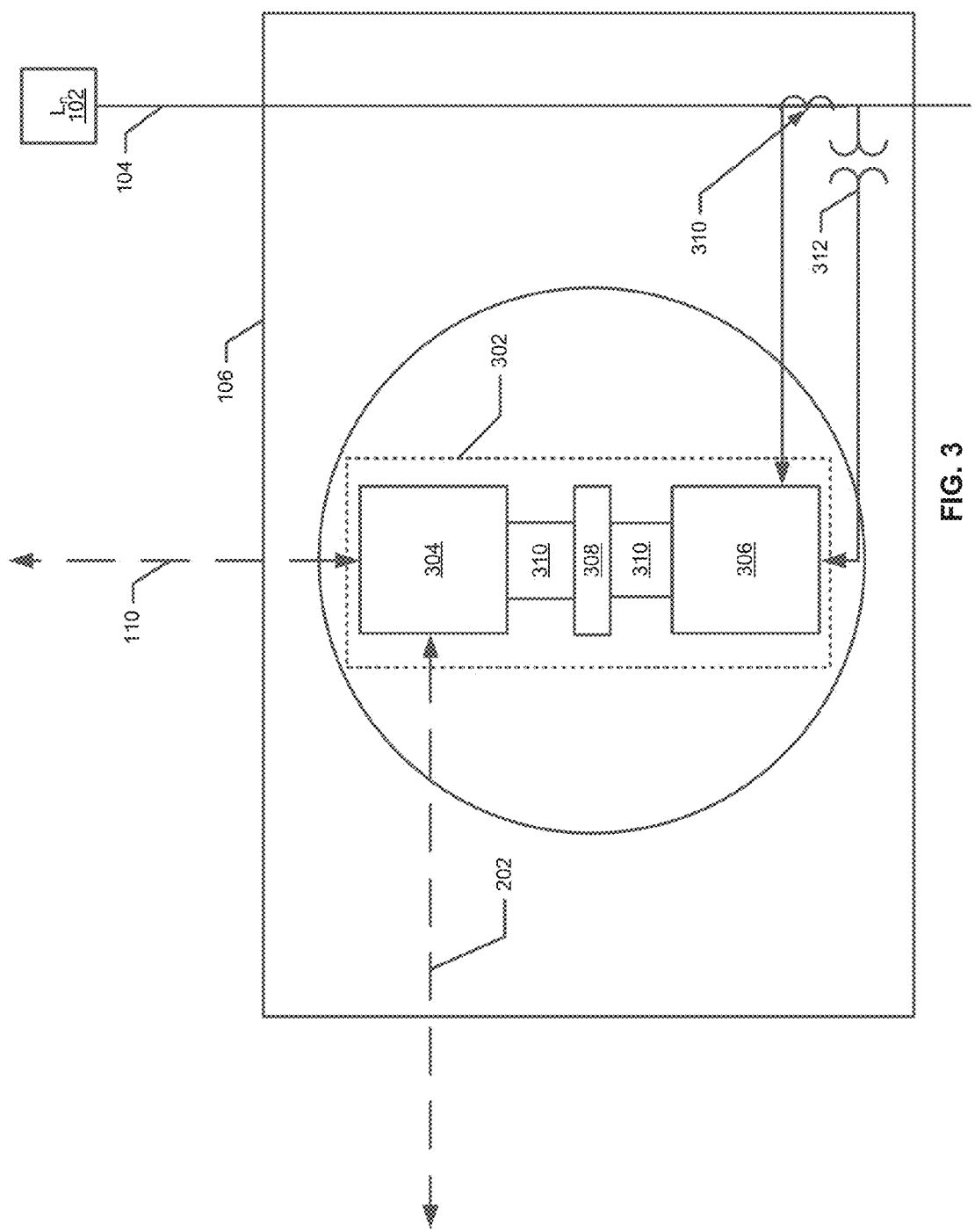
FIG. 3 illustrates an exemplary embodiment of a meter configured to communicate with at least a computing device over a first network and to communicate with smart appliances and devices over a second network.

FIG. 3 illustrates an embodiment of a meter 106 configured to communicate with at least a computing device 108 over a first network 110 or a second network 202. Also, as shown, the meter 106 can be configured to communicate with smart appliances and devices 204 over a second network 202. Meter electronics 302 enable the meter 106 to communicate with the devices 204 and the computing device 108. In one aspect, the meter electronics 302 of the meter 106 can be comprised of a first board 304. In one aspect, the first board 304 is comprised of at least a first processor and a communication interface operably connected with the first processor. In various embodiments, the first processor can comprise an 8, 16 or 32-bit processor. For example, the first processor can be one or more of a NEC v850 family microprocessor (NEC Corporation, Tokyo, Japan) and/or a Teridian 6533 controller or a Teridian 6521 controller as are available from Maxim Integrated Products, Inc. (Sunnyvale, Calif.), among other types of processors or controllers. In one aspect, the first board 304 comprises an advanced metering infrastructure (AMI) or automatic meter reading (AMR) board of a meter and the first processor comprises a processor for an AMI or AMR board. In one aspect, the first network 110 comprises an advanced metering infrastructure (AMI) network. In another aspect, the second network 202 comprises a home-area network (HAN).

Further comprising the meter electronics of FIG. 3 is a second board 306, wherein the second board 306 is comprised of at least a second processor. In various embodiments, the second processor can comprise an 8, 16 or 32-bit processor. For example, the second processor can be one or more of a NEC v850 family microprocessor (NEC Corporation, Tokyo, Japan) and/or a Teridian 6533 controller or a Teridian 6521 controller as are available from Maxim Integrated Products, Inc. (Sunnyvale, Calif.), among other types of processors or controllers. In one aspect, the second processor comprises a processor for a metrology and data manager board of a meter 106. In one aspect, the second board can receive metering input such as inputs from one or more current transformers (CTs) 312 and/or one or more potential transformers (PTs) 314, though other metering devices such as Rogowski coils, voltage dividers or bridges, and the like, are contemplated within the scope of embodiments of the invention.

Further comprising the meter electronics 302 is an interface port 308, wherein the interface port 308 connects the first board 304 and the second board 306. The interface port 308 can be connected to the respective boards by ribbon cable, wires, conductive paths, and the like 310. In one aspect, the interface port 308 comprises a 12-pin connector. In one aspect, the first processor on the first board 304 of FIG. 3 is configured to initiate communication activities with a device over a network using the communication interface. For example, the first processor can initiate communication activities with a computing device 108 over the first network 110. In another aspect, the first processor can be configured to communicate with smart appliances and devices 204 over a second network 202. The first processor can be further configured to provide a separate signal to the second board 306 using the interface port 308, wherein the separate signal indicates a presence of communication activities between the processor of the first board 304 and the device over either the first 110 or second 202 networks. In one aspect, the separate signal is discontinued by the first processor when the communication activities between the first processor and the other device end. In one aspect, the separate signal is provided to the second processor on pin 12 of the 12-pin connector. In one aspect, the separate signal comprises a wave form signal. In one aspect, the wave form signal comprises a pulse-width modulated signal such that the width of the pulse indicates the type for the communication activities between the first processor and the other device over the network. In one aspect, the separate signal can be at a frequency of 300 Hz, though signals of any other frequency are considered within the scope of embodiments of this invention.

Figure 4:
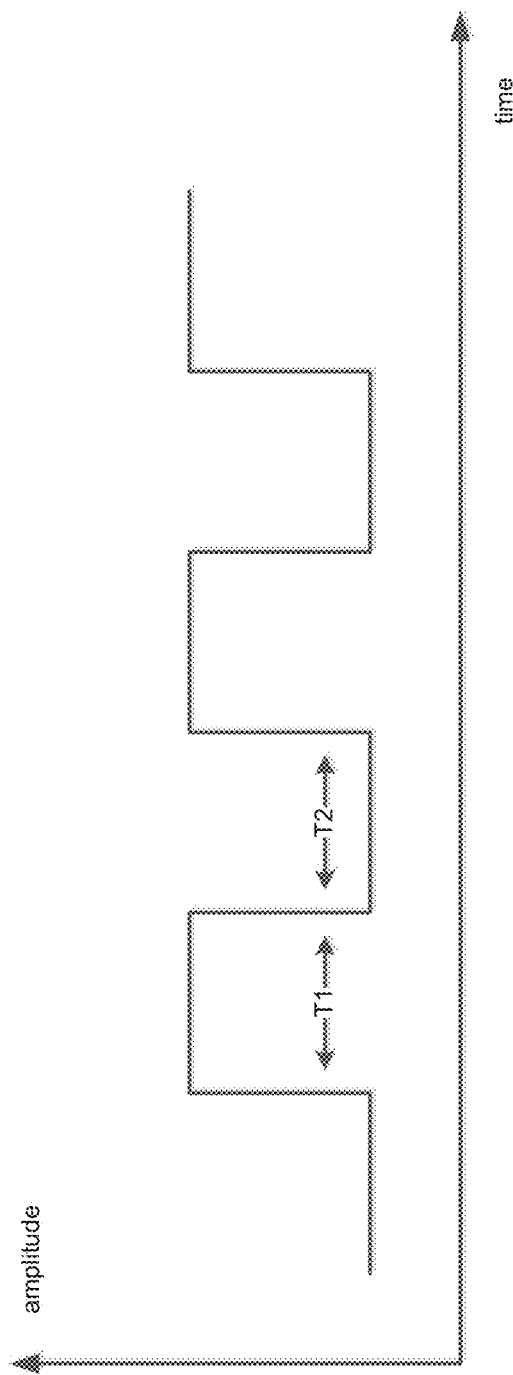
FIG. 4 illustrates an exemplary pulse-width modulated signal wherein the width of the pulse can be used to determine the type of communication activities between the first processor and the other device over the network, according to an embodiment of the present invention.

The second processor on the second board 306 can be configured to receive the separate signal from the first processor of the first board 304 using the interface port 308, wherein the separate signal indicates the presence of communication activities between the processor of the first board 304 and the device over the network 110, 202. In one aspect, the second processor is further configured to determine, from the signal, a type for the communication activities between the first processor and the other device over the network 110, 202. For example, if the signal is a pulse-width modulated signal as described above and shown in FIG. 4, then the second processor can use the width of the pulse to determine the type of communication activities between the first processor and the other device over the network. For example, based on the width of the pulse (refer to FIG. 4), the second processor can use exemplary Table I, below, to determine the type of communication activity.

TABLE I

| T1 | T2 | Type of Communication Activity |
|---|---|---|
| 80% | 20% | power line communication (PLC) |
| 70% | 30% | ZigBee ® communication |
| 60% | 40% | radio communication (e.g., 900 MHz radio communication) |
| 50% | 50% | optical communication |
| 40% | 60% | Bluetooth communication |
| 30% | 70% | TCP/IP |
| 20% | 80% | wireless TCP/IP |
| 10% | 90% | ModBus ® |

It is to be appreciated that the types of communication and pulse widths described in Table 1 are exemplary only and non-limiting. Other communication types and different pulse width combinations are considered within the scope of embodiments of this invention. Further, in other aspects the amplitude of the signal or the combination of the amplitude and period of the signal can be used to determine the type of communication activity.

In one aspect, the second processor can be further configured to provide an output that indicates the type for the communication activities between the first processor and the other device. In one aspect, the output can be used to drive a display to indicate the type for the communication activities between the first processor and the other device. The display can be local to the meter 106 or remote. If remote, the output can be sent over a network (wired, wireless or a combination of wired and wireless) to drive the display. The networks 110, 202 can be used in aspects of the invention to carry the output to a display. In one aspect, the display comprises one or more of a light-emitting diode (LED) or a liquid-crystal display (LCD). For example, a series of dots on the meter display can be used to designate the type of communication activity (e.g., PLC is one dot, ZigBee® is two dots, etc.). In one aspect, upon power up the second processor receives the signal for an interim period and determines the type of communication activities between the first processor and the other device over the network before providing the output. For example, the second processor can receive the signal for 10 seconds upon power up and determine the type of communication activities between the first processor and the other device over the network before providing the output. For example, in one aspect the meter can be powered down and the first (communication) board replaced. The communication type may be changed from power line carrier (PLC) to ZigBee® by replacing the first board. When the meter is powered back up, the signal may be provided to the processor of the second board for a period of time (e.g., 10 seconds) before the second processor provides the output.

Figure 5:
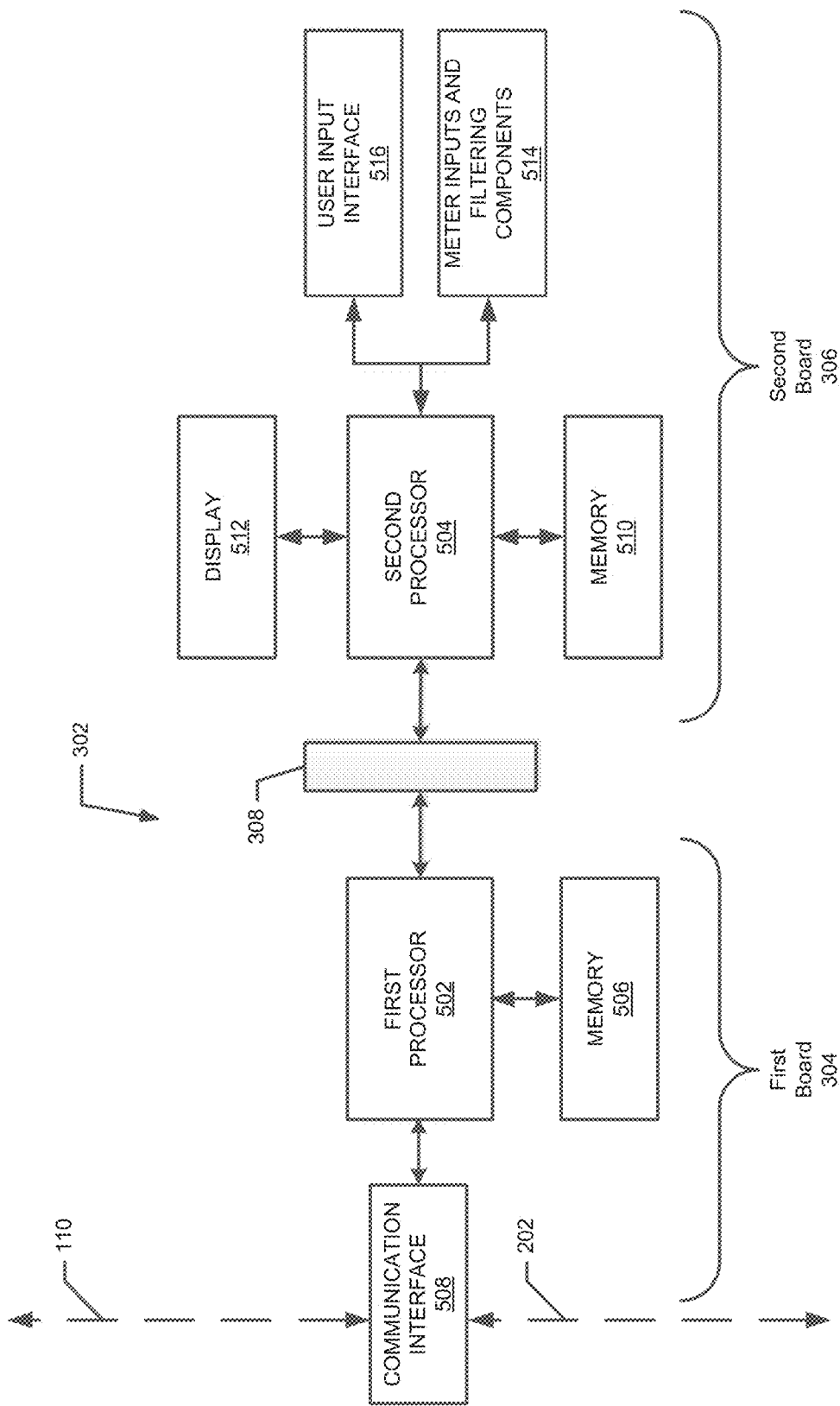
FIG. 5 illustrates an embodiment of an entity capable of operating as meter electronics in accordance with one embodiment of the present invention.

Referring now to FIG. 5, a block diagram of an entity capable of operating as meter electronics 302 is shown in accordance with one embodiment of the present invention. The entity capable of operating as meter electronics 302 includes various means for performing one or more functions in accordance with embodiments of the present invention, including those more particularly shown and described herein. It should be understood, however, that one or more of the entities may include alternative means for performing one or more like functions, without departing from the spirit and scope of the present invention. As shown, the entity capable of operating as meter electronics 302 can generally include two electronic boards, first board 304 and second board 306 that are connected by interface port 308, as previously described herein. The first board 304 and the second board 306 include means, such as the first processor 502 and the second processor 504, respectively, for performing or controlling the various functions of the entity. As shown in FIG. 5, the first board is comprised of the first processor 502, a memory 506 operably connected with the first processor 502 and a communication interface 508 that is also operably connected with the first processor 502 and with one or more networks 100, 202. In one aspect, the communication interface 508 provides a means for transmitting and/or receiving data, content or the like. In one aspect, the communication interface 508 can comprise a radio such as a wireless router. As noted above, the first processor 502 can comprise an 8, 16 or 32-bit processor. For example, the first processor 502 can be one or more of a NEC v850 family microprocessor (NEC Corporation, Tokyo, Japan) and/or a Teridian 6533 controller or a Teridian 6521 controller as are available from Maxim Integrated Products, Inc. (Sunnyvale, Calif.), among other types of processors or controllers. In one aspect, the first processor 502 comprises a processor for an advanced metering infrastructure (AMI) or automatic meter reading (AMR) board of a meter 106. The first processor 502 can be configured to initiate communication activities with a device over a network 110, 202. In one aspect, the network 110 can comprise an advanced metering infrastructure (AMI) network. In another aspect, the network 202 can comprise a home-area network (HAN). Other networks are also considered within the scope of embodiments of the invention. In one aspect, the device that the first processor 502 communicates with can comprise a server such as computing device 108. In another aspect, the device that the first processor communicates with can comprise a smart appliance 204. The first processor 502 can be further configured to provide a separate signal, wherein the separate signal indicates a presence of the communication activities with the device over the network 110, 202. In one aspect, the separate signal is provided to the second processor 504 of the second board through the interface port 308. In one aspect, the first processor 502 is configured to discontinue the separate signal when communication activities with the device end. In one aspect, the separate signal comprises a wave form signal. In one aspect, the wave form signal comprises a pulse-width modulated signal such that the width of the pulse indicates the type for the communication with the device over the network 110, 202, as described herein.

Further comprising the meter electronics 302 of FIG. 5 is a second board 306. Comprising the second board 306 is the second processor 504, a memory 510, a display 512, metering (metrology) inputs and filtering components 514, and an optional user input interface 516. The memory 510, display 512, metering (metrology) inputs and filtering components 514, and optional user input interface 516 are each operably interconnected with the second processor 504. In the embodiment of FIG. 5, the second board 306 is connected with the first board 304 through the interface port 308. Though shown separately, it is to be appreciated that the first board 304 and the second board 306 may share a common memory. As noted above, the second processor 504 can comprise an 8, 16 or 32-bit processor. For example, the second processor 504 can be one or more of a NEC v850 family microprocessor (NEC Corporation, Tokyo, Japan) and/or a Teridian 6533 controller or a Teridian 6521 controller as are available from Maxim Integrated Products, Inc. (Sunnyvale, Calif.), among other types of processors or controllers. In one aspect, the second processor 504 comprises a processor for a metrology and data manager board 306 of a meter 106. In one aspect, the second processor 504 can be configured to receive the separate signal from the first processor 502 through the interface port 308, wherein the signal indicates the presence of communication activities between the first processor 502 and another device over a network 110, 202. In one aspect, the second processor 504 can be configured to determine, from the signal, a type for the communication activities between the first processor 502 and the other device over the network 110, 202. In one aspect, determining, from the signal, the type for the communication activities between the first processor 502 and the other device over the network 110, 202 comprises determining whether the type for the communication activities is one of power line communication, ZigBee® communication, radio communication, optical communication, Bluetooth communication, TCP/IP, wireless TCP/IP, ModBus®, and the like. In one aspect, the second processor can be configured to provide an output that indicates the type for the communication activities between the first processor 502 and the other device. In one aspect, the output can be used to drive a display 512 to indicate the type for the communication activities between the first processor 502 and the device. In various aspects, the display 512 can comprise one or more of a light-emitting diode (LED) or a liquid-crystal display (LCD). In one embodiment, the second board 306 can comprise meter inputs and filtering components 514. In one aspect, the meter inputs and filter components 514 can comprise, for example, voltage (e.g., PTs) and current (e.g., CTs) inputs, one or more ADCs, one or more Rogowski coils, filtering components, and the like. As noted above, the first processor 502 and the second processor 504 are in communication with or include memory 506, 510, such as volatile and/or non-volatile memory that stores content, data or the like. For example, the memory 506, 510 may store content transmitted from, and/or received by, the entity. For example, the memory 506 may store information and executable code shown and described in the flowchart of FIG. 6 and the memory 510 may store information and executable code shown and described in the flowchart of FIG. 7. Similarly, the memory 506, 510 may store information as it is being transmitted to the devices 108, 204 such as the message content. The second board 306 may also include a user input interface 516. The user input interface 516 can comprise any of a number of devices allowing the entity to receive data from a user, such as a keypad, a touch display, a joystick or other input device, or a means such as a serial bus (e.g., USB) for connecting another device such as a laptop computer with the second board 306.

Referring now to FIG. 6, the operations are illustrated that may be taken by the second processor. At step 602, the second processor receives a signal from the first processor, wherein the signal indicates a presence of communication activities between a first processor and another device over a network. In one aspect, a type for the communication activities between the first processor and the other device over the network can be determined from the signal, wherein the type for the communication activities can comprise one of power line communication, ZigBee® communication, radio communication, optical communication, Bluetooth® communication, TCP/IP, wireless TCP/IP, ModBus®, and the like. In one aspect, signal comprises a wave form signal. In one aspect, the wave form signal comprises a pulse-width modulated signal such that the width of the pulse indicates the type for the communication activities between the first processor and the other device. In one aspect, the signal is discontinued when the communication activities between the first processor and another device end.

FIG. 7 is a flowchart illustrating operations that may be taken by the first processor. In FIG. 7, the process includes step 702, initiating communication activities between the first processor a device over a network. At step 704, the first processor provides a separate a signal, wherein the separate signal indicates a presence of the communication activities with the device over the network. In one aspect, the separate signal is provided to the second processor, as described herein. In one aspect, the first processor discontinues the separate signal when communication activities with the device end.

Figure 8:
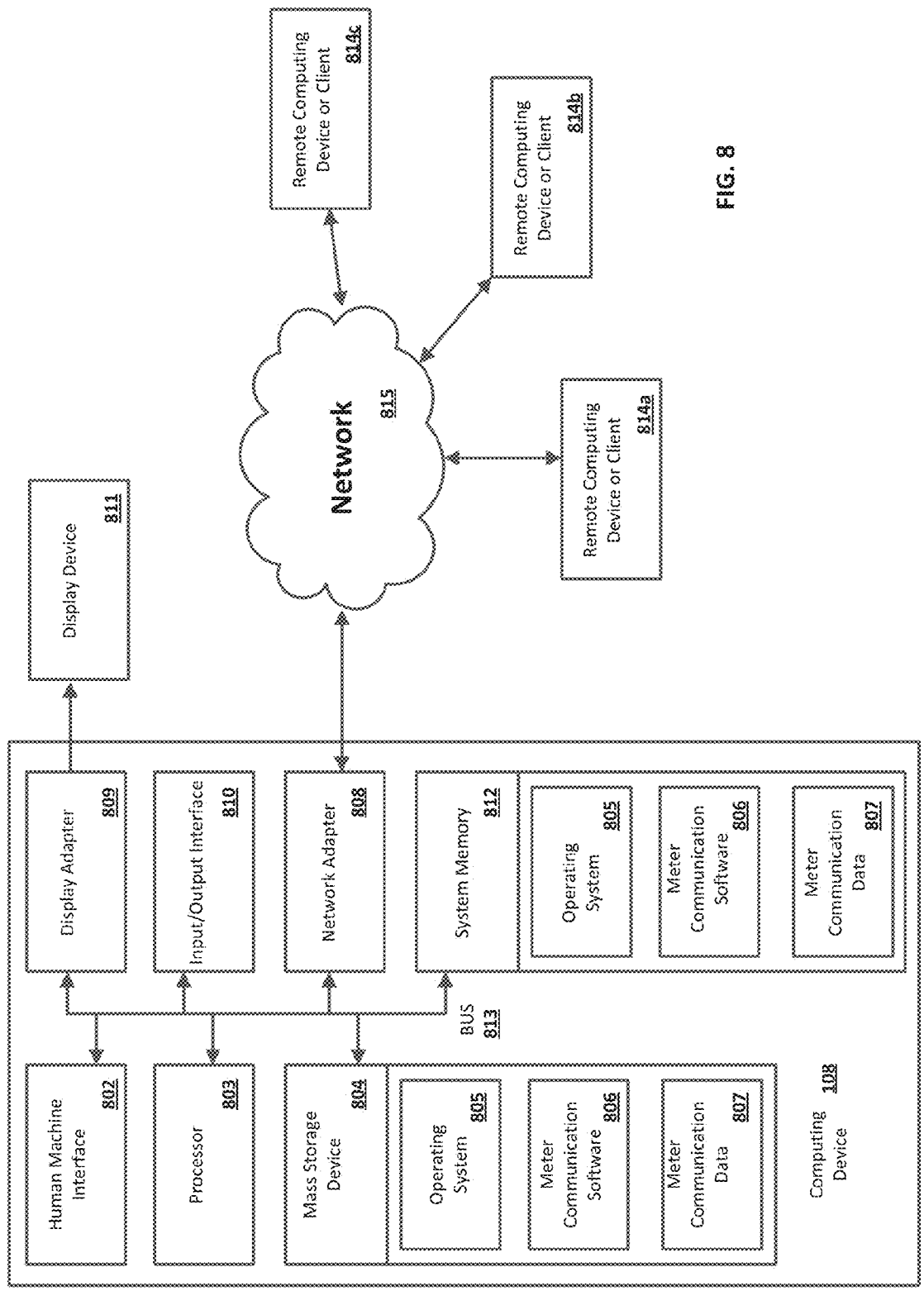
FIG. 8 is a block diagram illustrating an exemplary operating environment for performing aspects of the disclosed methods.

The above system has been described above as comprised of units. One skilled in the art will appreciate that this is a functional description and that software, hardware, or a combination of software and hardware can perform the respective functions. A unit, such as a smart appliance or device, a smart meter, a smart grid, a utility computing device, a vendor or manufacturer's computing device, etc., can be software, hardware, or a combination of software and hardware. The units can comprise, meter communication software 806 such as, for example, DRMS software as illustrated in FIG. 8 and described below. In one exemplary aspect, the units can comprise a computing device 108 as illustrated in FIG. 8 and described below.

FIG. 8 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, smart meters, smart-grid components, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 108. The components of the computer 108 can comprise, but are not limited to, one or more processors or processing units 803, a system memory 812, and a system bus 813 that couples various system components including the processor 803 to the system memory 812. In the case of multiple processing units 803, the system can utilize parallel computing.

The system bus 813 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 813, and all buses specified in this description can also be implemented over a wired or wireless network connection and each of the subsystems, including the processor 803, a mass storage device 804, an operating system 805, meter communication software 806, meter communication data, a network adapter 808, system memory 812, an Input/Output Interface 810, a display adapter 809, a display device 811, and a human machine interface 802, can be contained within one or more remote computing devices or clients 814*a, b,c* at physically separate locations, connected through buses of this form, in effect implementing a fully distributed system or distributed architecture.

The computer 108 typically comprises a variety of computer readable media. Exemplary readable media can be any available media that is non-transitory and accessible by the computer 108 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data such as meter communication data 807 and/or program modules such as operating system 805 and meter communication software 806 that are immediately accessible to and/or are presently operated on by the processing unit 803.

In another aspect, the computer 108 can also comprise other non-transitory, removable/non-removable, volatile/non-volatile computer storage media. By way of example, FIG. 8 illustrates a mass storage device 804 that can provide non-volatile storage of computer code, computer readable instructions, data structures, program modules, and other data for the computer 108. For example and not meant to be limiting, a mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 804, including by way of example, an operating system 805 and meter communication software 806. Each of the operating system 805 and meter communication software 806 (or some combination thereof) can comprise elements of the programming and the meter communication software 806. Meter communication data 807 can also be stored on the mass storage device 804. Update information data 807 can be stored in any of one or more databases known in the art. Examples of such databases comprise, DB2® (IBM Corporation, Armonk, N.Y.), Microsoft® Access, Microsoft® SQL Server, (Microsoft Corporation, Bellevue, Wash.), Oracle®, (Oracle Corporation, Redwood Shores, Calif.), mySQL, PostgreSQL, and the like. The databases can be centralized or distributed across multiple systems.

In another aspect, the user can enter commands and information into the computer 108 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 803 via a human machine interface 802 that is coupled to the system bus 813, but can be connected by other interface and bus structures, such as a parallel port, game port, an IEEE 1394 Port (also known as a Firewire port), a serial port, or a universal serial bus (USB).

In yet another aspect, a display device 811 can also be connected to the system bus 813 via an interface, such as a display adapter 809. It is contemplated that the computer 108 can have more than one display adapter 809 and the computer 108 can have more than one display device 811. For example, a display device can be a monitor, an LCD (Liquid Crystal Display), or a projector. In addition to the display device 811, other output peripheral devices can comprise components such as speakers (not shown) and a printer (not shown), which can be connected to the computer 108 via Input/Output Interface 810. Any step and/or result of the methods can be output in any form to an output device. Such output can be any form of visual representation, including, but not limited to, textual, graphical, animation, audio, tactile, and the like.

The computer 108 can operate in a networked environment using logical connections to one or more remote computing devices or clients 814*a,b,c*. By way of example, a remote computing device 814 can be a personal computer, portable computer, a server, a router, a network computer, a smart meter, a vendor or manufacture's computing device, smart grid components, a peer device or other common network node, and so on. Logical connections between the computer 108 and a remote computing device or client 814*a,b,c* can be made via a local area network (LAN) and a general wide area network (WAN). Such network connections can be through a network adapter 808. A network adapter 808 can be implemented in both wired and wireless environments. Such networking environments are conventional and commonplace in offices, enterprise-wide computer networks, intranets, and other networks 815 such as the Internet.

For purposes of illustration, application programs and other executable program components such as the operating system 805 are illustrated herein as discrete blocks, although it is recognized that such programs and components reside at various times in different storage components of the computing device 108, and are executed by the data processor(s) of the computer. An implementation of meter communication software 806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

As described above and as will be appreciated by one skilled in the art, embodiments of the present invention may be configured as a system, method, or computer program product. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable non-transitory computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the first processor 502 and second processor 504 discussed above with reference to FIG. 5, to produce a machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus (e.g., first processor 502 and second processor 504 discussed above with reference to FIG. 5) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    receiving a signal, via a first hardware processor, wherein the signal indicates a presence of communication activities between the first hardware processor included in a first advanced metering infrastructure (AMI) or automatic meter reading (AMR) board of a meter and a device over a network, wherein the signal comprises a pulse-width modulated (PWM) signal representative of a type of the communication activities;
    providing the PWM signal representative of the type of the communication activities, via the first hardware processor, to a second hardware processor included in a second AMI or AMR board of the meter;
    determining, via the second hardware processor, the type of the communications activities between the first processor and the device based on the PWM signal, wherein the meter comprises circuitry to track energy usage; and
    providing, via the second hardware processor, an output that indicates the type for the communication activities between the first hardware processor and the device, wherein the second board comprises a metrology and data manager board of the meter.

2. The method of claim 1, wherein determining, from the PWM signal, the type for the communication activities between the first hardware processor and the device over the network comprises determining whether the type for the communication activities is one of power line communication, ZigBee® communication, radio communication, optical communication, Bluetooth® communication, TCP/IP, wireless TCP/IP, or ModBus®.

3. The method of claim 1, wherein the output is used to drive a display to indicate the type for the communication activities between the first processor and the device.

4. The method of claim 3, wherein the display comprises one or more of a light-emitting diode (LED) or a liquid-crystal display (LCD).

5. The method of claim 1, wherein the PWM signal comprises a wave form signal having a pulse width.

6. The method of claim 5, wherein the wave form signal pulse width indicates the type for the communication activities between the first processor and the device.

7. The method of claim 1, wherein the network comprises an advanced metering infrastructure (AMI) network.

8. The method of claim 1, wherein the network comprises a home-area network (HAN).

9. The method of claim 1, wherein the PWM signal is discontinued when the communication activities between the first hardware processor and device end.

10. The method of claim 1, wherein the other device comprises a server.

11. The method of claim 1, wherein the other device comprises a smart appliance.

12. A method comprising:
    initiating, by a device or a first hardware processor, via a first signal, communication activities between the first hardware processor included in a first advanced metering infrastructure (AMI) or automatic meter reading (AMR) board of a meter and the device over a network;
    providing, via the first hardware processor, a pulse-width modulated (PWM) signal separate from the first signal to a second hardware processor included in a second AMI or AMR board of the meter, wherein the PWM signal indicates a presence of the communication activities between the first hardware processor and the device over the network, wherein the meter comprises circuitry to track energy usage;
    determining, by the second hardware processor, from the PWM signal, a type of the communication activities between the first hardware processor and the device over the network; and
    providing, via the second hardware processor, an output that indicates the type for the communication activities between the first hardware processor and the device, wherein the second board comprises a metrology and data manager board of the meter.

13. The method of claim 12, wherein the PWM signal is discontinued when communication activities with the device end.

14. The method of claim 12, wherein determining by the second hardware processor, from the PWM signal, the type for the communication activities with the device over the network comprises the second hardware processor determining whether the type for the communication activities is one of power line communication, ZigBee® communication, radio communication, optical communication, Bluetooth® communication, TCP/IP, wireless TCP/IP, or ModBus®.

15. The method of claim 12, wherein the output is used to drive a display to indicate the type for the communication activities with the device.

16. The method of claim 15, wherein the display comprises one or more of a light-emitting diode (LED) or a liquid-crystal display (LCD).

17. The method of claim 12, wherein the PWM signal comprises a wave form signal.

18. The method of claim 17, wherein the wave form signal comprises a first pulse immediately followed by a second pulse, and wherein a first pulse width, a second pulse width, and the combination thereof, are all representative of the type for the communication with the device over the network.

19. The method of claim 12, wherein the network comprises an advanced metering infrastructure (AMI) network.

20. The method of claim 12, wherein the network comprises a home-area network (HAN).

21. The method of claim 12, wherein providing the first signal comprises the first hardware processor providing the first signal.

22. The method of claim 12, wherein initiating communication activities with the device over the network comprises the first hardware processor initiating communication activities with the device over the network.

23. The method of claim 12, wherein the device comprises a server.

24. The method of claim 12, wherein the device comprises a smart appliance.

25. A system comprised of:
a first board, wherein the first board is comprised of a first hardware processor and a communication interface operably connected with the first hardware processor;
a second board, wherein the second board is comprised of a second hardware processor; and
an interface port, wherein the interface port connects the first board and the second board,
wherein the first hardware processor is configured to:
initiate communication activities with a device over a network using the communication interface via a first signal; and
provide a pulse-width modulated (PWM) signal separate from the first signal to the second board using the interface port, wherein the PWM signal indicates a presence of communication activities between the first board and the device over the network,
wherein the second hardware processor is configured to:
receive the PWM signal from the first board using the interface port, wherein the PWM signal indicates the presence of communication activities between the first board and the device over the network; and
wherein the first board and the second board are disposed on an advanced metering infrastructure (AMI) or automatic meter reading (AMR) meter, wherein the second hardware processor is configured to determine, from the PWM signal, a type for the communication activities between the first hardware processor and the device over the network, wherein the second hardware processor is configured to provide an output that indicates the type for the communication activities between the first hardware processor and the device, and wherein the second board comprises a metrology and data manager board of the meter.

26. The system of claim 25, wherein the second hardware processor configured to determine, from the PWM signal, the type for the communication activities between the first processor and the device over the network comprises the second hardware processor configured to determine whether the type for the communication activities is one of power line communication, ZigBee®communication, radio communication, optical communication, Bluetooth® communication, TCP/IP, wireless TCP/IP, or ModBus®.

27. The system of claim 25, further comprising a display, wherein the output is used to drive the display to indicate the type for the communication activities between the first hardware processor and the ether device.

28. The system of claim 27, wherein the display comprises one or more of a light-emitting diode (LED) or a liquid-crystal display (LCD).

29. The system of claim 25, wherein the PWM signal comprises a wave form signal.

30. The system of claim 29, wherein the wave form signal comprises a first pulse having a first width and a second pulse having a second width, wherein the first width, the second width, or the combination thereof indicates the type for the communication activities between the first hardware processor and the device over the network.

31. The system of claim 25, wherein the network comprises an advanced metering infrastructure (AMI) network.

32. The system of claim 25, wherein the network comprises a home-area network (HAN).

33. The system of claim 25, wherein the PWM signal is discontinued when the communication activities between the first hardware processor and the etlaeF device end.

34. The system of claim 25, wherein the interface port comprises a 12-pin connector.

35. The system of claim 34, wherein the PWM signal is provided to the second hardware processor on pin 12 of the 12-pin connector.

36. The system of claim 25, wherein the first hardware processor comprises an 8, 16 or 32-bit processor.

37. The system of claim 25, wherein the second hardware processor comprises an 8, 16 or 32-bit processor.

38. The system of claim 25, wherein the device comprises a server.

39. The system of claim 25, wherein the device comprises a smart appliance.

* * * * *